United States Patent
Hou et al.

(10) Patent No.: US 9,458,381 B2
(45) Date of Patent: Oct. 4, 2016

(54) LIQUID CRYSTAL COMPOUNDS CONTAINING DEUTERIUM

(71) Applicant: Shijiazhuang Chengzhi Yonghua Display Materials Co., Ltd, Shijiazhuang, Hebei Prov. (CN)

(72) Inventors: Ze Feng Hou, Shijiazhuang (CN); Wen Hai Lu, Shijiazhuang (CN); Xing Zhang, Shijiazhuang (CN); Guo Liang Yun, Shijiazhuang (CN); Rui Mao Hua, Shijiazhuang (CN); Ming Li, Shijiazhuang (CN); Lei Zhao, Shijiazhuang (CN)

(73) Assignee: SHIJIAZHUANG CHENGZHI YONGHUA DISPLAY MATERIALS CO., LTD., Shijiazhuang, Hebei Province (CN)

( * ) Notice: Subject to any disclaimer, the term of this patent is extended or adjusted under 35 U.S.C. 154(b) by 0 days.

(21) Appl. No.: 14/323,487

(22) Filed: Jul. 3, 2014

(65) Prior Publication Data
US 2014/0312275 A1    Oct. 23, 2014

(30) Foreign Application Priority Data
Jan. 21, 2014 (CN) .......................... 2014 1 0026971

(51) Int. Cl.
C09K 19/20 (2006.01)
C09K 19/30 (2006.01)
C09K 19/32 (2006.01)
C09K 19/34 (2006.01)
C09K 19/40 (2006.01)
C09K 19/44 (2006.01)
C09K 19/04 (2006.01)
C09K 19/12 (2006.01)

(52) U.S. Cl.
CPC .......... *C09K 19/3402* (2013.01); *C09K 19/20* (2013.01); *C09K 19/3066* (2013.01); *C09K 19/3068* (2013.01); *C09K 19/402* (2013.01); *C09K 19/44* (2013.01); C09K 2019/0466 (2013.01); C09K 2019/123 (2013.01); C09K 2019/301 (2013.01); C09K 2019/3004 (2013.01); C09K 2019/3009 (2013.01); C09K 2019/3016 (2013.01); C09K 2019/3018 (2013.01); C09K 2019/3019 (2013.01); C09K 2019/3021 (2013.01); C09K 2019/3031 (2013.01); C09K 2019/3071 (2013.01); C09K 2019/3078 (2013.01); C09K 2019/3083 (2013.01); C09K 2019/3422 (2013.01)

(58) Field of Classification Search
CPC .............. C09K 19/20; C09K 19/3066; C09K 19/3402; C09K 19/402; C09K 19/44; C09K 2019/3078; C09K 2019/3422; C09K 2019/123; C09K 2019/3016; C09K 2019/3019; C09K 19/30; C09K 19/321; C09K 19/322; C09K 19/325; C09K 19/326; C09K 2019/0466; C09K 2019/3004; C09K 2019/301; C09K 2019/3009; C09K 2019/3018; C09K 2019/3021; C09K 2019/3031; C09K 2019/3071; C09K 2019/3077; C09K 2019/3083; C09K 2019/3025; C09K 2019/124
See application file for complete search history.

(56) References Cited

U.S. PATENT DOCUMENTS

| | | | | |
|---|---|---|---|---|
| 5,209,867 | A * | 5/1993 | Koden | ............... C09K 19/0225 252/299.65 |
| 5,536,443 | A * | 7/1996 | Takatsu et al. | .......... 252/299.63 |
| 6,287,646 | B1 * | 9/2001 | Takeuchi | ................ C07C 63/04 252/299.67 |
| 7,198,827 | B1 * | 4/2007 | Takeuchi | ............. C09K 19/322 252/299.01 |
| 2002/0053659 | A1 * | 5/2002 | Takeuchi et al. | ........ 252/299.66 |
| 2014/0312276 | A1 * | 10/2014 | Lu et al. | .................. 252/299.63 |

* cited by examiner

*Primary Examiner* — Shean C Wu
(74) *Attorney, Agent, or Firm* — Muncy, Geissler, Olds & Lowe, P.C.

(57) ABSTRACT

This invention relates to liquid crystal compound of formula I containing benzene derivatives group that hydrogen substituted by deuterium. Liquid crystal compounds of formula I have not only large positive dielectric anisotropy, but also moderate optical anisotropy and driving voltage, thereby having great significance to formulate a liquid crystal mixture. A liquid crystal mixture containing such type of liquid crystal compounds can be applied in various display devices, which is particularly suitable for TN and STN display devices, and can also be used in IPS and VA display devices.

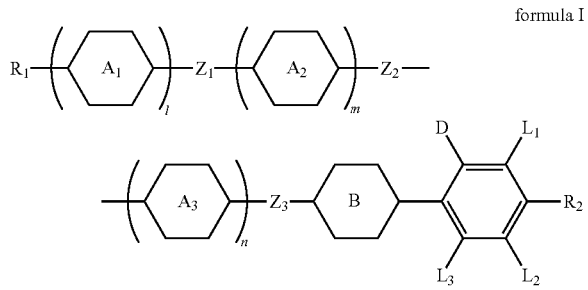

formula I

17 Claims, No Drawings

LIQUID CRYSTAL COMPOUNDS CONTAINING DEUTERIUM

TECHNICAL FIELD

This invention relates to the field of liquid crystal compounds and application, furthermore relates to liquid crystal compounds containing a benzene derivatives group that hydrogen substituted by deuterium, and their preparation method and application.

TECHNICAL BACKGROUND

Currently the liquid crystal compounds are widely applied in various types of displays, electro-optical devices, sensors and the like. A large number of liquid crystal compounds have been used in display area, wherein the nematic liquid crystal is most widely used. Nematic liquid crystals have been used in passive TN, STN matrix display and TFT active matrix system.

Although the technology of thin-film-transistor liquid-crystal display (TFT-LCD) has been mature, it should be continuously improved to decrease the response time, to widen the phase transition temperature, to decrease the driving voltage, and so on. It has been well-known that liquid crystals play an important role to improve the characteristics of LCDs.

The liquid crystal compounds are required to have high chemical and thermal stability, as well as high stability in electric field and electromagnetic radiation. The liquid crystal compounds used in TFT-LCD not only should be stable to heat, UV light, electric field, and electromagnetic radiation, but also have the wide temperature range of a nematic phase, appropriate optical anisotropy, very high resistance, high voltage holding ratio, and good intermiscibility with other liquid crystal compounds.

In order to improve performance of the liquid crystal display, to develop a low rotational viscosity γ1 (even at low temperature), a high dielectric anisotropy (Δε) of the liquid crystal mixture has an important significance. Therefore, the development of liquid crystal monomer having appropriate physical and chemical properties is the top priority in the future research.

A liquid crystal compound having a benzene derivatives group that hydrogen substituted by deuterium will have good performance but no technical limitations.

DESCRIPTION OF THE INVENTION

The objective of the present invention is to provide a liquid crystal compound having a benzene derivatives group that hydrogen substituted by deuterium, and its preparation method and application.

The liquid crystal compound of formula I can be applied as the liquid crystal composition to make a large refractive index and high dielectric anisotropy.

The invention relates to liquid crystal compound is expressed by general formula I:

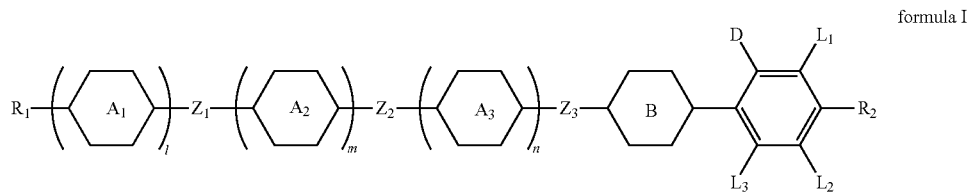

formula I in which, $R_1$, $R_2$ is selected from:

H, Cl, F, CN, OCN, $OCF_3$, $CF_3$, $CHF_2$, $CH_2F$, $OCHF_2$, SCN, NCS, $SF_5$ and alkyl having 1 to 15 carbons, fluorinated alkyl having 1 to 15 carbons, chlorinated alkyl having 1 to 15 carbons, deuterated alkyl having 1 to 15 carbons, alkoxy having 1 to 15 carbons, fluorinated alkoxy having 1 to 15 carbons, chlorinated alkoxy having 1 to 15 carbons, deuterated alkoxy having 1 to 15 carbons, alkenyl having 2 to 15 carbons, fluorinated alkenyl having 2 to 15 carbons, chlorinated alkenyl having 2 to 15 carbons, deuterated alkenyl having 2 to 15 carbons, alkenoxy having 2 to 15 carbons, fluorinated alkenoxy having 2 to 15 carbons, chlorinated alkenoxy having 2 to 15 carbons, deuterated alkenoxy having 2 to 15 carbons, cyclopropane, cyclobutane, cyclopentane, cyclohexane, cycloheptane wherein one or more —$CH_2$— independently of one another are replaced by —CH=CH—, —C≡C—, —COO—, —OOC—, —O— or —S—;

Rings $A_1$, $A_2$ and $A_3$ independently of one another are selected from: a single bond,

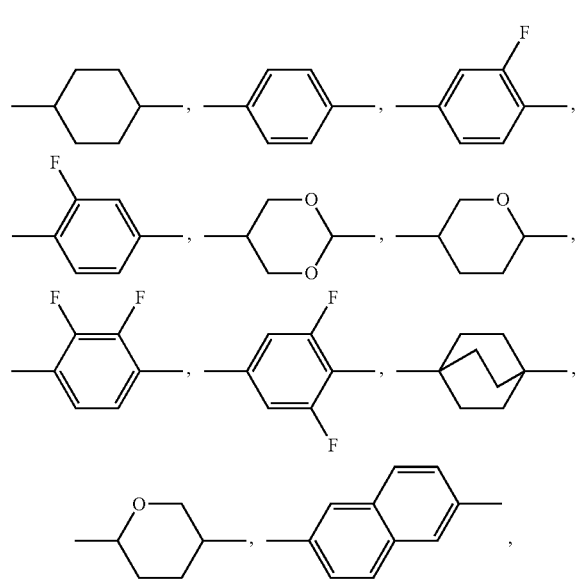

-continued

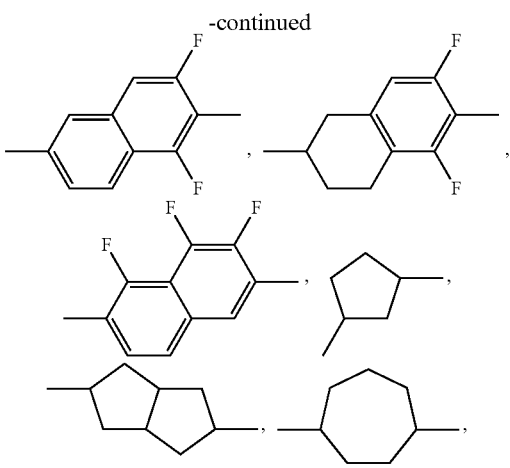

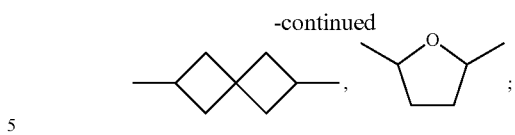

Ring B is selected from 1,4-phenylene or 1,4-phenylene, which may be monosubstituted or polysubstituted by fluorine, deuterium, chlorine;

l is 0, 1; m is 0, 1; n is 0, 1.

$Z_1$, $Z_2$ and $Z_3$ are selected from a single bond, —$CH_2$—, —$CH_2$—$CH_2$—, —$(CH_2)_3$—, —$(CH_2)_4$—, —CH=CH—, —C≡C—, —COO—, —OOC—, —$CF_2O$—, —$OCH_2$—, —$CH_2O$—, —$OCF_2$—, —$CF_2CH_2$—, —$CH_2CF_2$—, —$C_2F_4$— and —CF=CF—;

$L_1$, $L_2$ and $L_3$ are selected from H, F, Cl and D.

Specifically, the formula I is formula Ia,

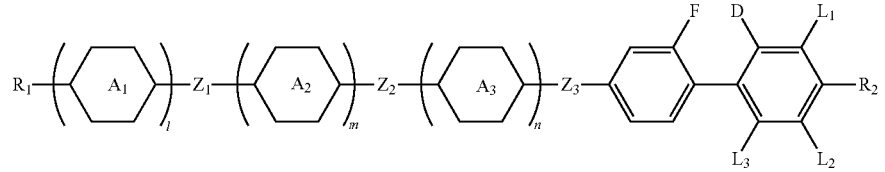

formula Ia wherein, R1, R$_2$, Ring A$_1$, Ring A$_2$, Ring A$_3$, l, m, n, Z$_1$, Z$_2$, Z$_3$, L$_1$, L$_2$ and L$_3$ are as defined above.

More specifically, the compound of the formula I is at least one compound of the formula I1 to I3:

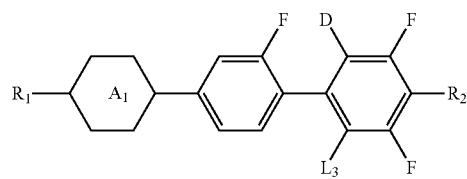

I1

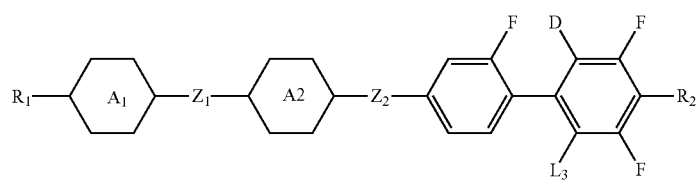

I2

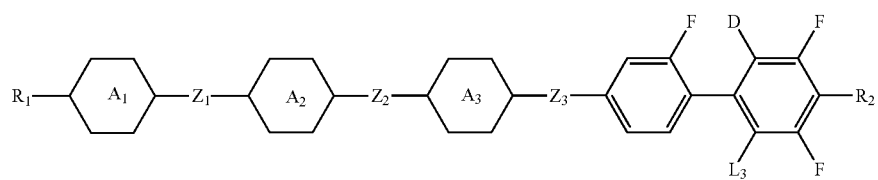

I3

Wherein, R1, R$_2$, Ring A$_1$, Ring A$_2$, Ring A$_3$, Z$_1$, Z$_2$, Z$_3$ and L$_3$ are as defined above.

Liquid crystal compound of formula I can be synthesized by the following scheme:

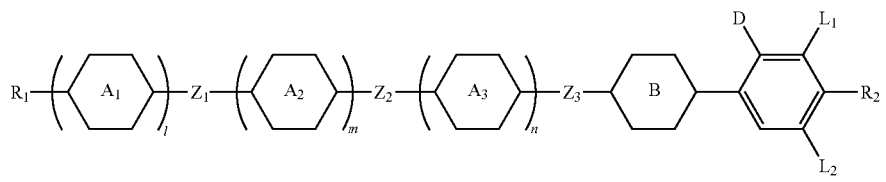
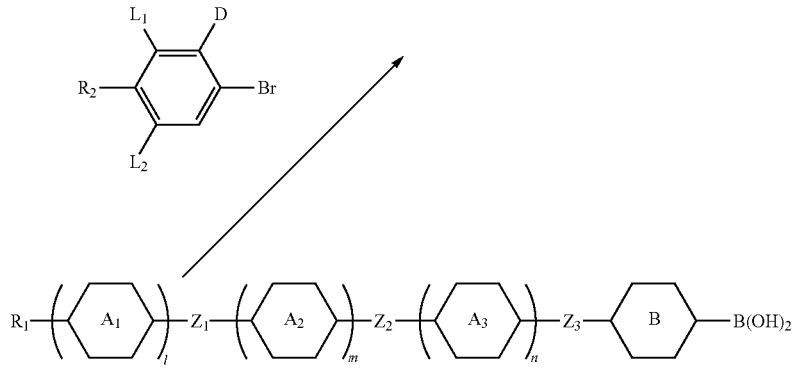
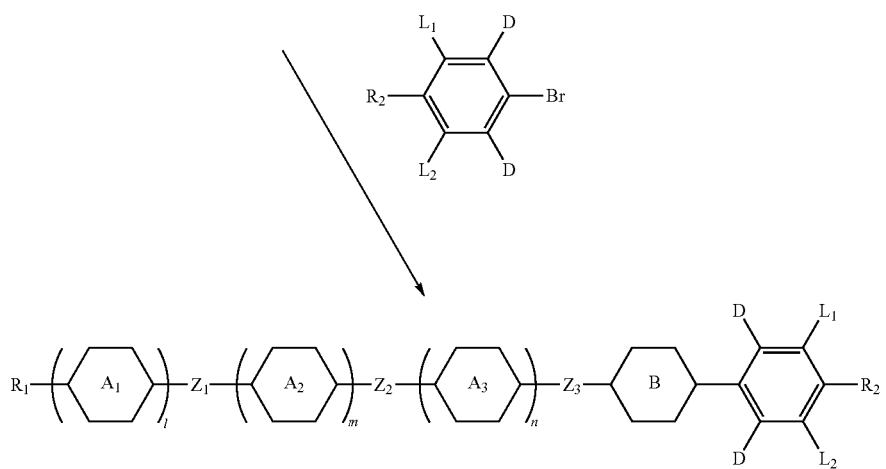
Mix up
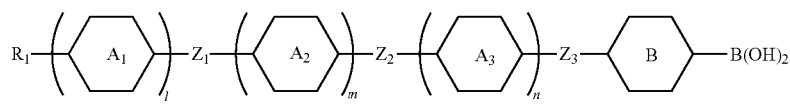
with
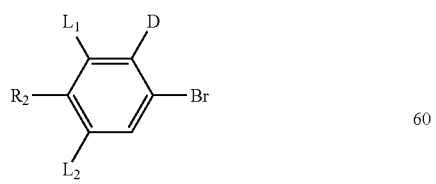
in the presence of carbonate and tetrakis(triphenylphosphine)palladium under reflux afforded

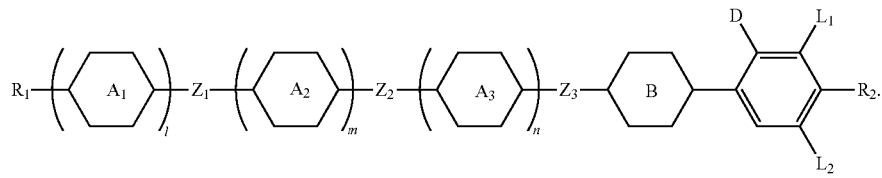

Wherein, R1, $R_2$, Ring $A_1$, Ring $A_2$, Ring $A_3$, l, m, n, $Z_1$, $Z_2$, $Z_3$, $L_1$ and $L_2$ are as defined above.

In the synthetic method, said carbonate is selected from sodium carbonate or potassium carbonate; the molar ratio of

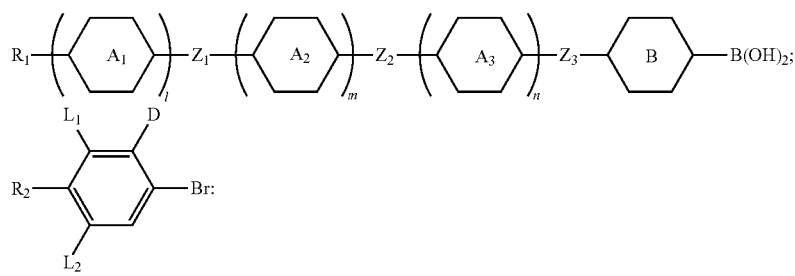

carbonate:tetrakis(triphenylphosphine)palladium is 1:1~1.3: 1~2:0.002~0.02, preferably is 1:1.1:1.2:0.0075; reflux time is 3~8 hours, preferably is 5 hours.

The synthetic method of

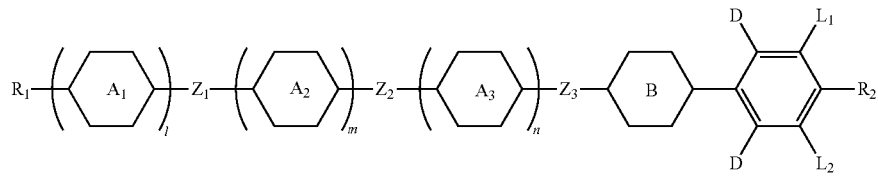

is the same as above. The said liquid-crystal mixture further comprises component b, component c, component d, component e, component f;

Therein the component b comprises one or more compounds selected from the following formula II;

The component c comprises one or more compounds selected from the following formula III;

The component d comprises one or more compounds selected from the following formula IV;

The component e comprises one or more compounds selected from the following formula V;

The component f comprises one or more compounds selected from the following formula VI;

(II)

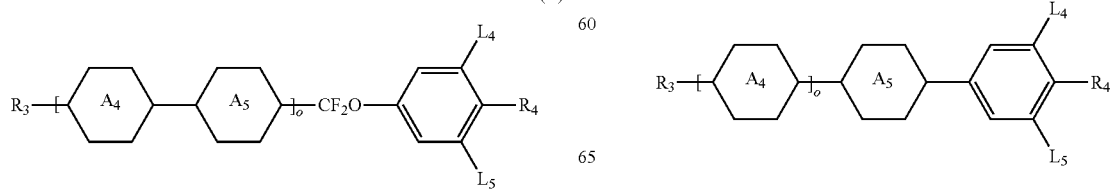

-continued (III)

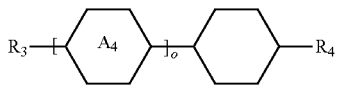

(IV)

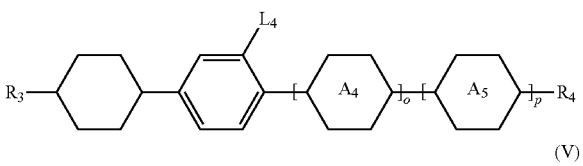

(V)

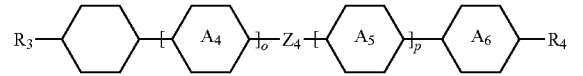

(VI)

Formula II to VI, in which $R_3$ and $R_4$ are selected from halogen atom, —CN, alkyl having 1 to 7 carbons, alkoxy having 1 to 7 carbons, alkenyl having 2 to 7 carbons, fluorinated alkoxy having 1 to 5 carbons.

$Z_4$ selected from a single bong, —CH$_2$CH$_2$—, —CH=CH—, —C≡C—, —COO—, —OOC—, —OCH$_2$—, —CH$_2$O—, —CF$_2$O—, —OCF$_2$—;

Rings $A_4$, $A_5$ and $A_6$ independently of one another are selected from: a single bond,

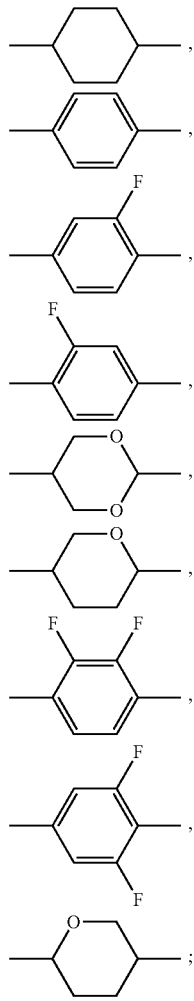

$L_4$ and $L_5$ are H, F, Cl and CN;

o and p are 0, 1 or 2.

The said compound characterized in that the formula II is at least one compound of the formula II-1 to II-13.

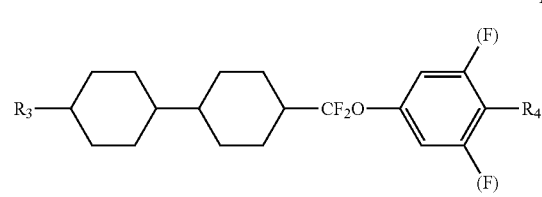
II-1

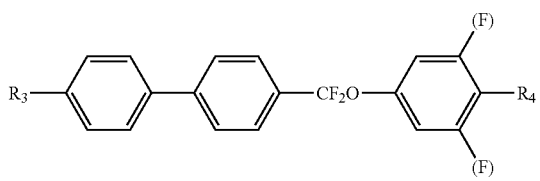
II-2

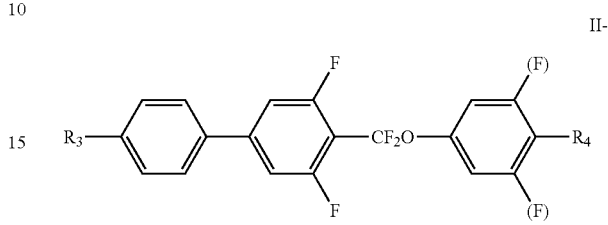
II-3

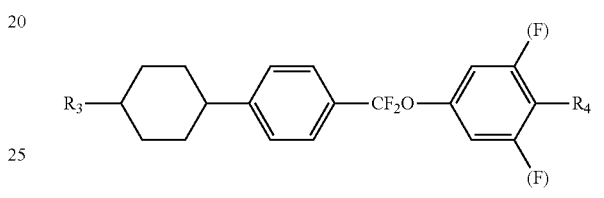
II-4

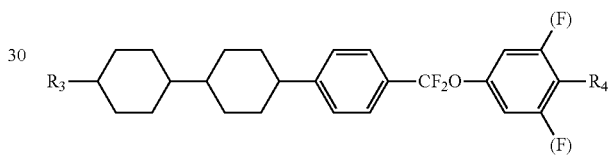
II-5

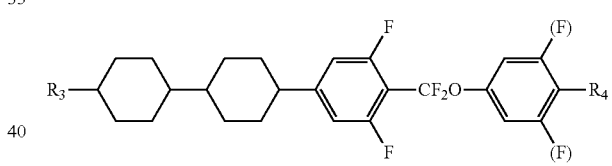
II-6

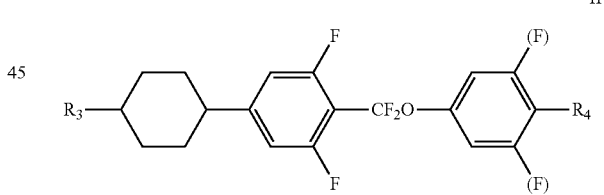
II-7

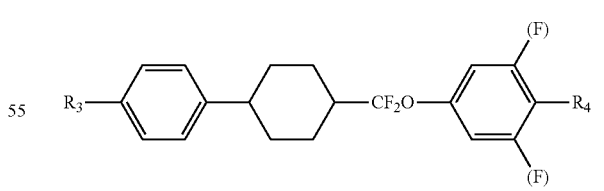
II-8

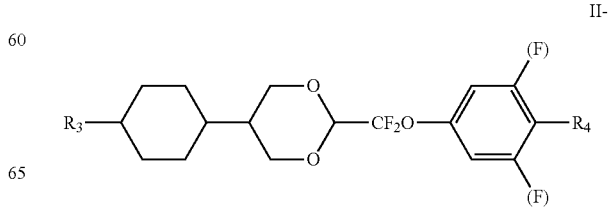
II-9

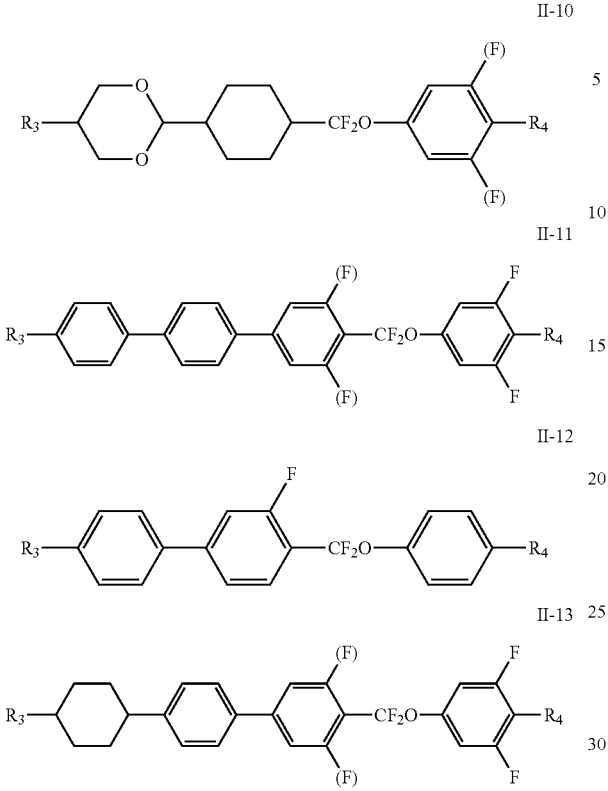

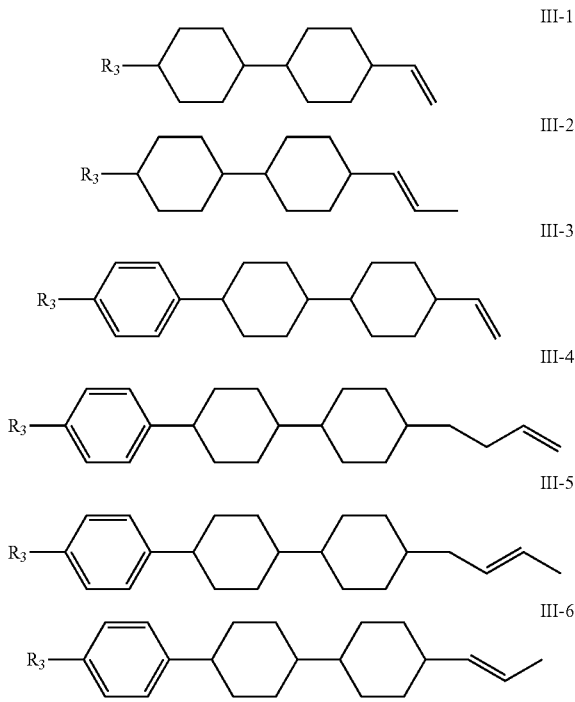

Formula II-1 to II-13, in which $R_3$ and $R_4$ are as defined in formula II; —(F) is —F or —H.

The said compound characterized in that the formula III is at least one compound of the formula III-1 to III-10.

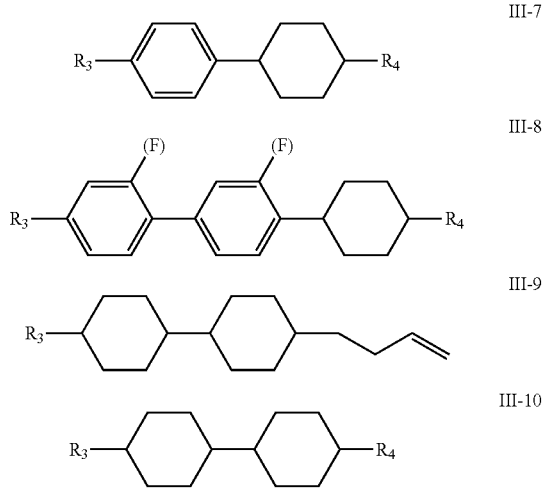

Formula IV-1 to IV-13, in which $R_3$ and $R_4$ are as defined in formula II; —(F) is —F or —H.

The said compound characterized in that the formula V is at least one compound of the formula IV-1 to IV-3.

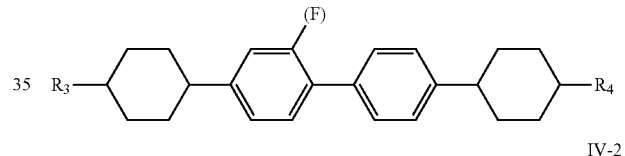

Formula IV-1 to IV-3, in which $R_3$ and $R_4$ are as defined in formula II; —(F) is —F or —H.

The said compound characterized in that the formula V is at least one compound of the formula V-1 to V-17.

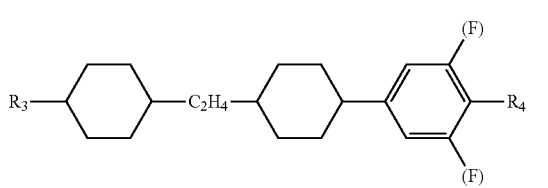

V-2
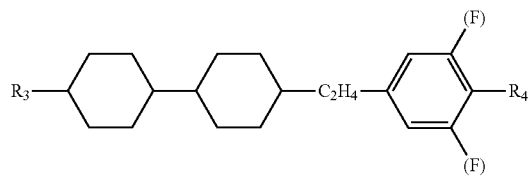
V-3
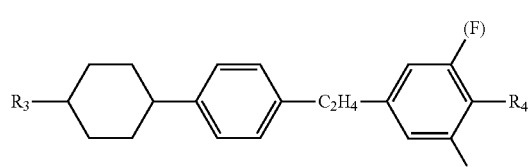
V-4
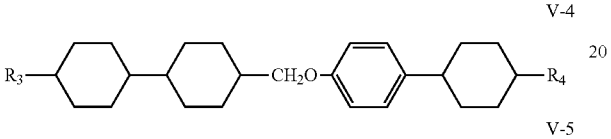
V-5
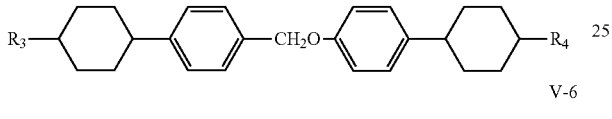
V-6
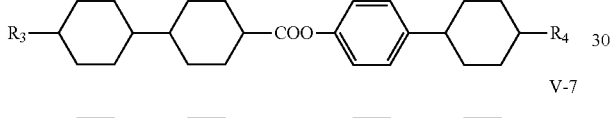
V-7
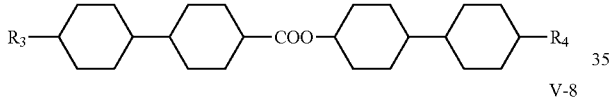
V-8
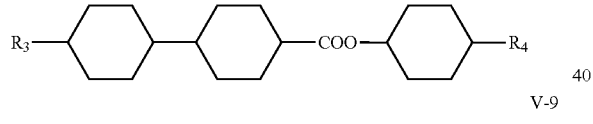
V-9
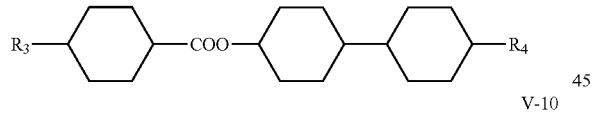
V-10
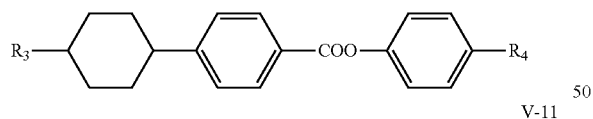
V-11
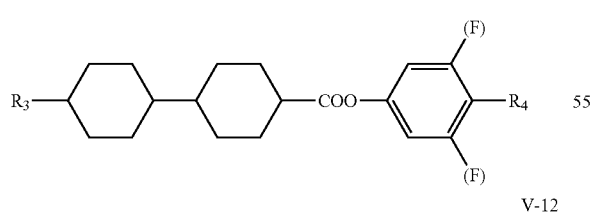
V-12
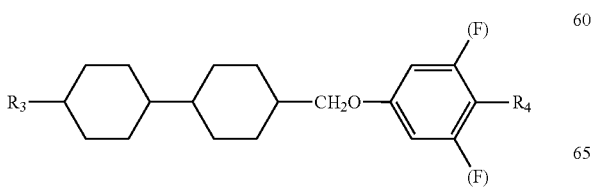
V-13
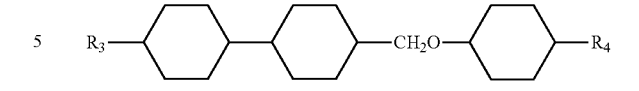
V-14
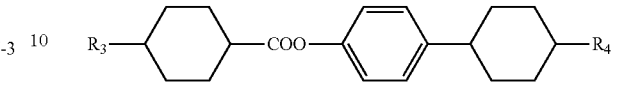
V-15
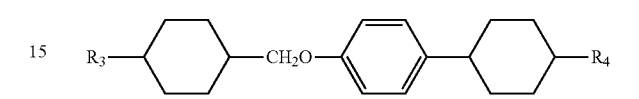
V-16
V-17
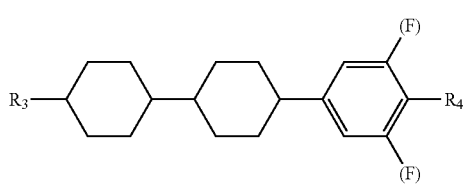
Formula V-1 to V-17, in which $R_3$ and $R_4$ are as defined in formula II; —(F) is —F or —H.
The said compound characterized in that the formula VI is at least one compound of the formula VI-1 to VI-13.
VI-1
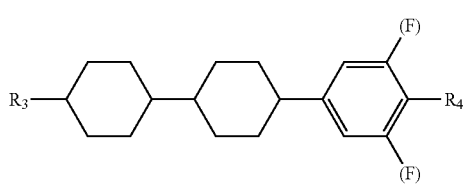
VI-2
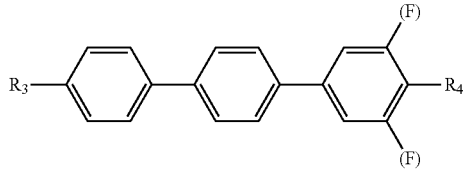
VI-3
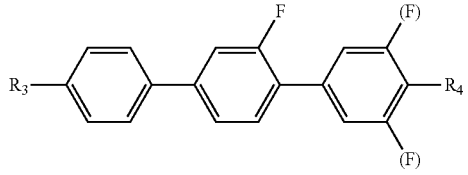
VI-4
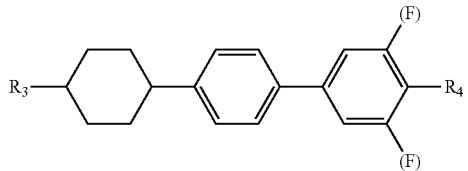

VI-5 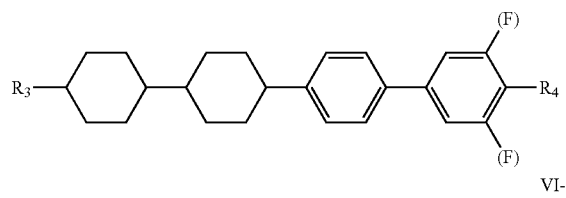

VI-6 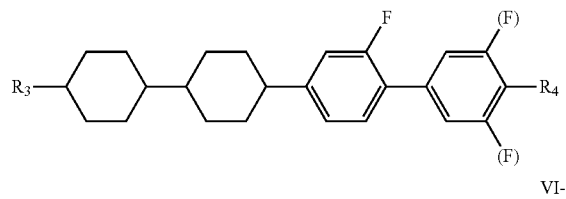

VI-7 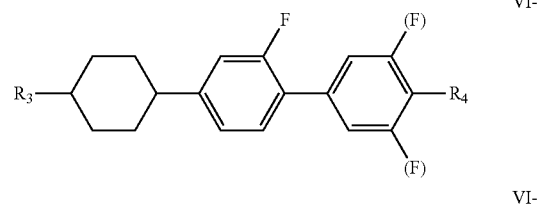

VI-8 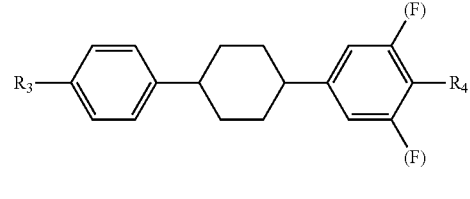

VI-9 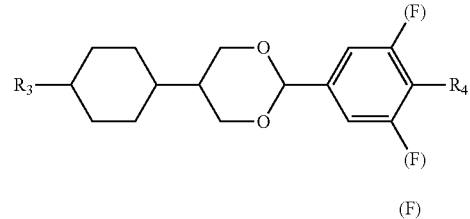

VI-10 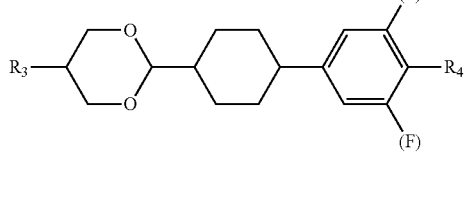

VI-11 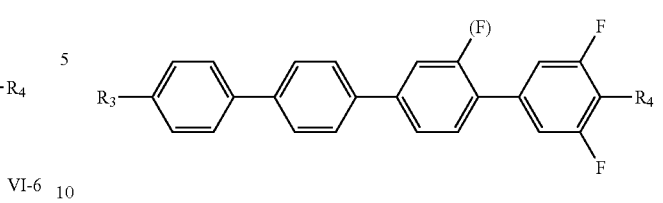

VI-12 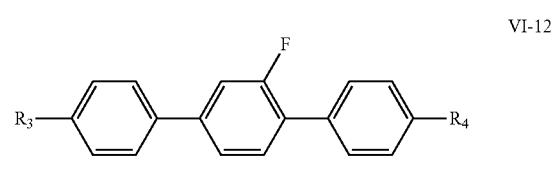

VI-13 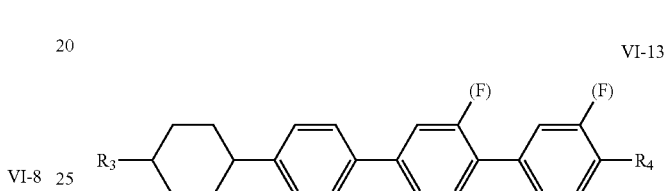

Formula VI-1 to VI-13, in which $R_3$ and $R_4$ are as defined in formula II; —(F) is —F or —H.

Wherein the liquid crystal mixture, the mass ratio of component b, component c, component d, component e and component f will be 3-40: 3-70: 3-30: 3-30: 3-40 in the liquid crystal mixtures.

Specifically, the liquid crystal mixture consists of component a-f, the mass ratio of component a, component b, component c, component d, component e and component f will be 10-80: 3-40: 3-70: 3-30: 3-30: 3-40 in the liquid crystal mixtures.

Specifically, the said liquid crystal mixture is mixture a, b, c, d, e:

The mixture a consists of the following compounds in which the compounds have the following mass ratio:

| | compound | mass ratio (%) |
|---|---|---|
| I | 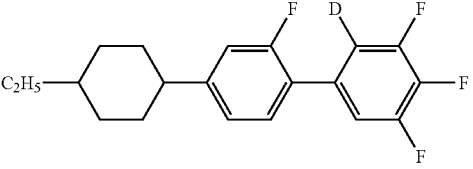 [SMILES: [2H]c1c(-c2ccc(C3CCC(CC)CC3)cc2F)cc(F)c(F)c1F] | 12 |
| I | 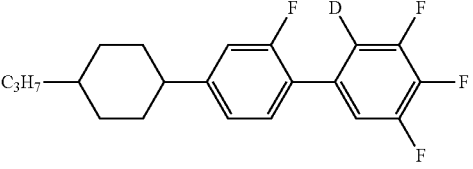 | 20 |

-continued

| | compound | mass ratio (%) |
|---|---|---|
| I | C₄H₉–⟨Ph⟩–⟨Ph⟩–⟨Ph(F)⟩–⟨Ph(D,F,F,F,D)⟩ | 5 |
| II | C₂H₅–⟨Cy⟩–⟨Cy⟩–CF₂O–⟨Ph(F,F,F)⟩ | 13 |
| II | C₃H₇–⟨Ph⟩–⟨Ph(F,F)⟩–CF₂O–⟨Ph(F,F,F)⟩ | 11 |
| II | C₂H₅–⟨dioxane⟩–⟨Cy⟩–CF₂O–⟨Ph(F,F,F)⟩ | 3 |
| II | C₃H₇–⟨Cy⟩–⟨Ph⟩–⟨Ph(F,F)⟩–CF₂O–⟨Ph(F,F,F)⟩ | 3 |
| III | H₃C–⟨Ph⟩–⟨Cy⟩–⟨Cy⟩–CH=CH₂ | 9 |
| III | C₃H₇–⟨Cy⟩–⟨Cy⟩–CH=CH₂ | 11 |
| IV | C₃H₇–⟨Cy⟩–⟨Ph(F)⟩–⟨Ph⟩–⟨Cy⟩–C₃H₇ | 4 |
| V | C₃H₇–⟨Cy⟩–⟨Cy⟩–COO–⟨Ph⟩–⟨Cy⟩–C₃H₇ | 4 |
| VI | C₅H₁₁–⟨Cy⟩–⟨Ph(F)⟩–⟨Ph(F,F,F)⟩ | 5 |

The mixture b consists of the following compounds in which the compounds have the following mass ratio:
| compound | | mass ratio (%) |
|---|---|---|
| I | 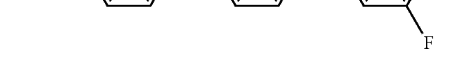 | 10 |
| I | 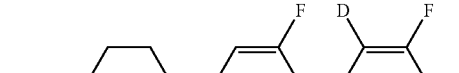 | 11 |
| I | 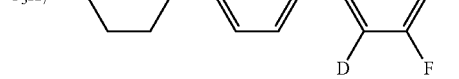 | 13 |
| II |  | 11 |
| II | 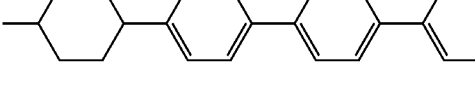 | 15 |
| II |  | 2 |
| II | 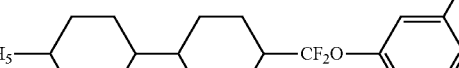 | 7 |
| III | 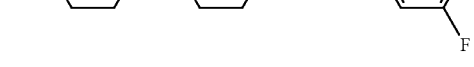 | 6 |
| IV | 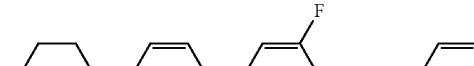 | 9 |

-continued
| | compound | mass ratio (%) |
|---|---|---|
| V | 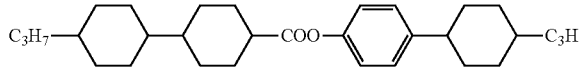 | 6 |
| VI | 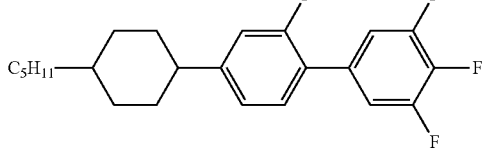 | 10 |
The mixture c consists of the following compounds in which the compounds have the following mass ratio:
| | compound | mass ratio (%) |
|---|---|---|
| I | 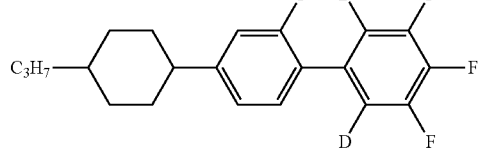 | 10 |
| I | 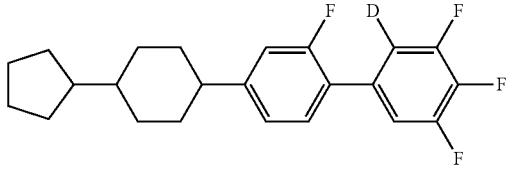 [SMILES: [2H]c1c(-c2ccc(C3CCC(C4CCCC4)CC3)cc2F)cc(F)c(F)c1F] | 10 |
| I | 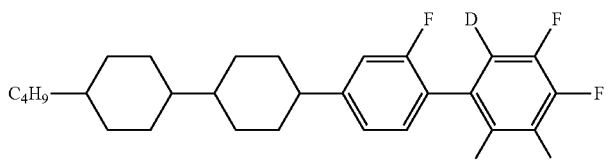 | 8 |
| I | 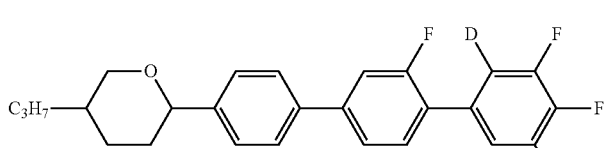 | 9 |
| II | 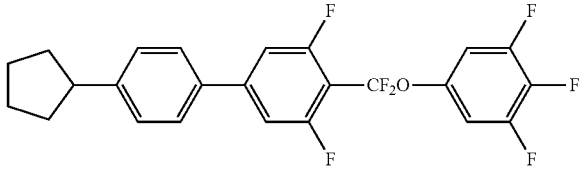 | 10 |
| II | 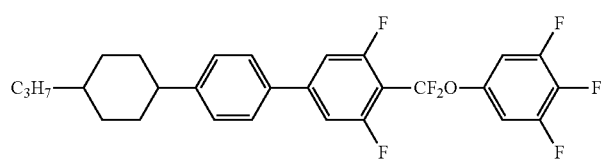 | 6 |

-continued
| compound | mass ratio (%) |
|---|---|
| II 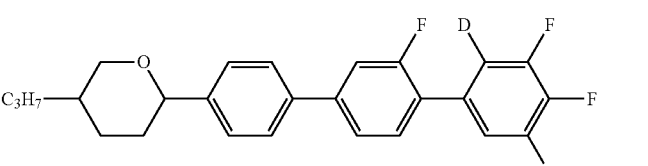 | 7 |
| III | 4 |
| III | 17 |
| IV | 5 |
| V | 5 |
| V | 4 |
| VI | 5 |
The mixture d consists of the following compounds in which the compounds have the following mass ratio:
| compound | mass ratio (%) |
|---|---|
| I 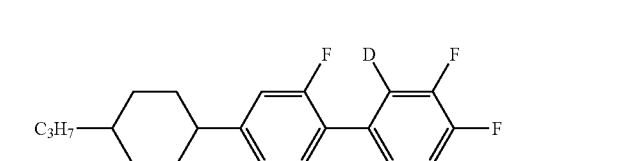 | 6 |
| I | 10 |
| I 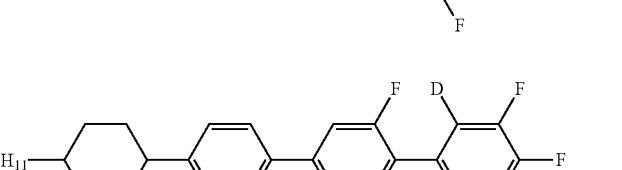 | 6 |

| compound | mass ratio (%) |
|---|---|
| II 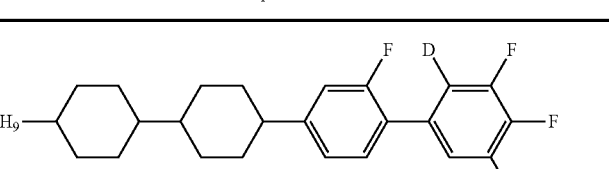 | 14 |
| II | 13 |
| III | 18 |
| III | 8 |
| IV | 8 |
| V | 13 |
| VI | 4 |
The mixture e consists of the following compounds in which the compounds have the following mass ratio:
| compound | mass ratio (%) |
|---|---|
| I 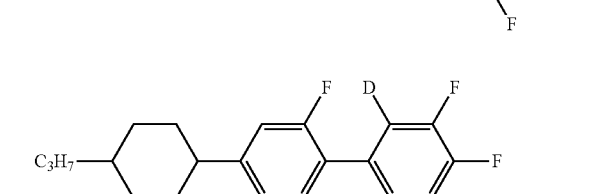 | 12 |
| I | 20 |

| compound | mass ratio (%) |
|---|---|
| I 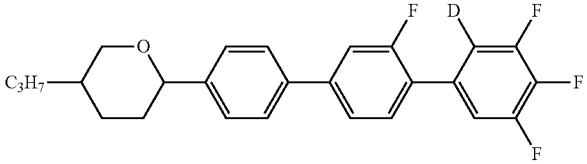 | 13 |
| II 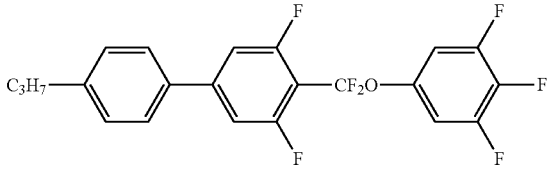 | 14 |
| II 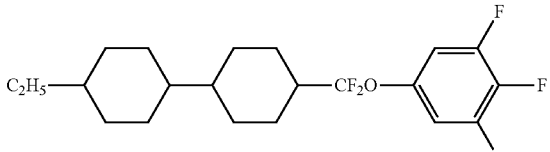 | 6 |
| III  | 10 |
| IV 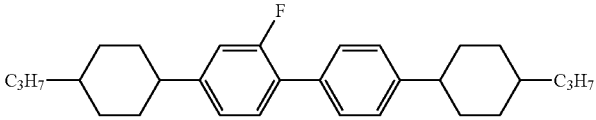 | 5 |
| V 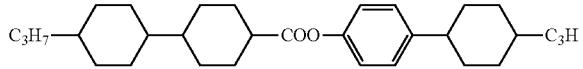 | 5 |
| VI 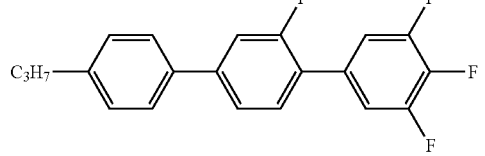 | 15 |

In addition, the present invention provides the preparation and application of compounds of formula I in liquid crystal mixture or electro-optical display material. The liquid crystal mixture and electro-optical display material containing the compounds of formula I are also included in the scope of this patent.

THE EXAMPLES OF THE PRESENT INVENTION

The following examples illustrate the present invention without limiting it in any way. If no special instructions the raw materials can be obtained from commercial sources. GC is gas chromatography purity, mp is melting point, cp is clearing point, ms is mass spectrometry, $\Delta\varepsilon$ is dielectric anisotropy, $\Delta n$ is optical anisotropy.

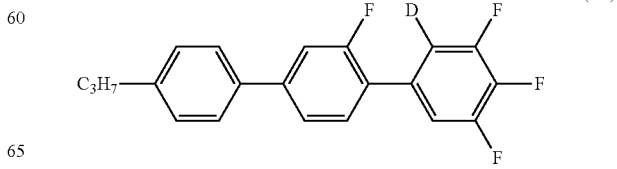

(I-1)

Example 1

Preparation of

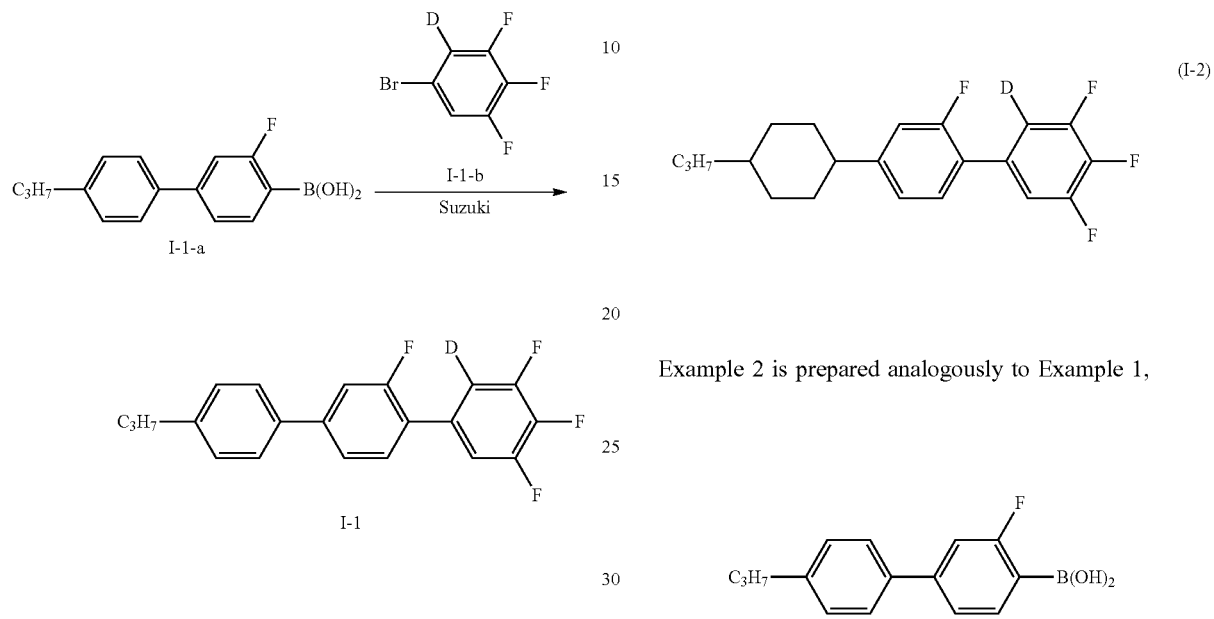

A mixture of 22.2 g (0.11 mol) of (I-1-a), 18.8 g (0.1 mol) of (I-1-b), 50 mL of toluene, 15 mL of ethanol, 15 mL of water, 12.7 g (0.12 mol) of sodium carbonate and 0.825 g (0.00075 mol) of tetrakis(triphenylphosphine) palladium in a 250 mL-three-necked flask was refluxed under $N_2$ for 5 hours.

After cooled to room temperature, the organic phase was separated, and the aqueous phase was extracted with 20 mL of toluene. The combined organic phase was washed with water to neutral, and the solvent was distilled off under reduced pressure. The obtained residue was then dissolved in 100 mL of petroleum ether and purified by silica gel column chromatography. 21 g of (I-1) was obtained as white crystals by the recrystallization from 100 mL of ethanol. Yield: 60%; GC purity: 99.9%.

GC-MS:$M^+$ 345 (49.6%), 316 (100%), 183 (3.8%);

$^1$H NMR (300 MHz, CHLOROFORM-D) δ 7.83 (d, J=7.8 Hz, 1H), 7.58 (d, J=7.8 Hz, 1H), 7.02 (d, J=7.8 Hz, 1H), 7.30 (d, J=7.3 Hz, 2H), 7.21 (d, J=11.0 Hz, 2H), 7.11-6.96 (m, 1H), 2.66 (t, J=7.6 Hz, 2H), 1.81-1.58 (m, 2H), 0.99 (td, J=7.3, 2.1 Hz, 3H).

On the basis of the above data, the structure of the obtained product is the expected compound I-1

The characterization data of I-1 are as follow:

mp: 86.9° C.

cp: 40.9° C.

Δn [589 nm, 20° C.]: 0.1962

Δε [1 KHz, 20° C.]: 19.04.

Example 2

Preparation of (I-2)

Example 2 is prepared analogously to Example 1, was replaced by (I-2) was obtained as white crystals.

GC-MS:$M^+$ 351 (52.3%), 322 (100%), 183 (3.6%);

$^1$H NMR (300 MHz, CHLOROFORM-D) δ 7.69 (d, J=7.8 Hz, 1H), 7.13 (d, J=7.8 Hz, 1H), 6.90 (d, J=7.8 Hz, 1H), 7.03-6.90 (m, 1H), 2.72 (t, J=7.6 Hz, 1H), 1.66 (t, J=7.6 Hz, 4H), 1.52 (t, J=7.6 Hz, 4H), 1.43 (t, J=7.6 Hz, 1H), 1.31 (t, J=7.6 Hz, 2H), 1.25 (m, 2H), 0.99 (td, J=7.3, 2.1 Hz, 3H).

On the basis of the above data, the structure of the obtained product is the expected compound I-2

The characterization data of I-2 are as follow:

mp: 62.4° C.

cp: 20.3° C.

Δn [589 nm, 20° C.]: 0.1203

Δε [1 KHz, 20° C.]: 11.56.

Example 3

Preparation of

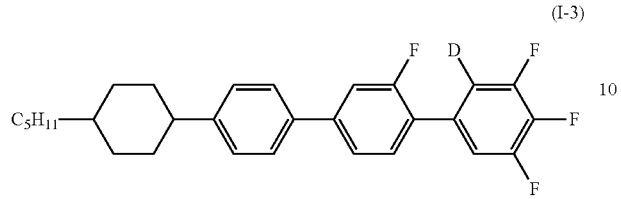
(I-3)

Example 3 is prepared analogously to Example 1,

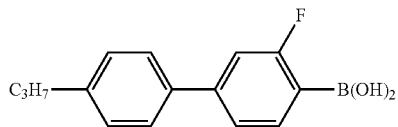

was replaced by

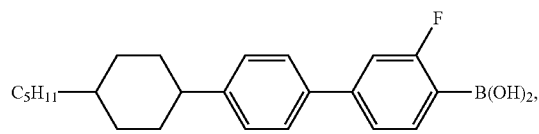

(I-3) was obtained as white crystals.

GC-MS:M+ 455 (51.6%), 426 (100%), 183 (2.7%);
$^1$H NMR (300 MHz, CHLOROFORM-D) δ 7.83 (d, J=7.8 Hz, 1H), 7.58 (d, J=7.8 Hz, 1H), 7.36 (m, 4H), 7.02 (d, J=7.8 Hz, 1H), 7.30-6.93 (m, 1H), 2.72 (t, J=7.6 Hz, 1H), 1.67 (t, J=7.6 Hz, 4H), 1.54 (t, J=7.6 Hz, 4H), 1.43 (t, J=7.6 Hz, 1H), 1.31 (t, J=7.6 Hz, 2H), 1.29 (t, J=7.6 Hz, 4H), 1.25 (m, 2H), 0.99 (td, J=7.3, 2.1 Hz, 3H).

On the basis of the above data, the structure of the obtained product is the expected compound I-3

The characterization data of I-3 are as follow:
mp: 76.8° C.
cp: 203.5° C.
Δn [589 nm, 20° C.]: 0.2117
Δε [1 KHz, 20° C.]: 19.2.

The following liquid crystal compounds of formula I were obtained using the method described in example 1-3 to replace only the different corresponding reactants.

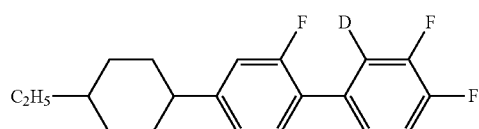

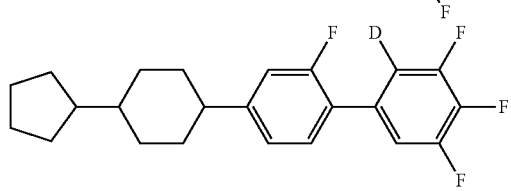

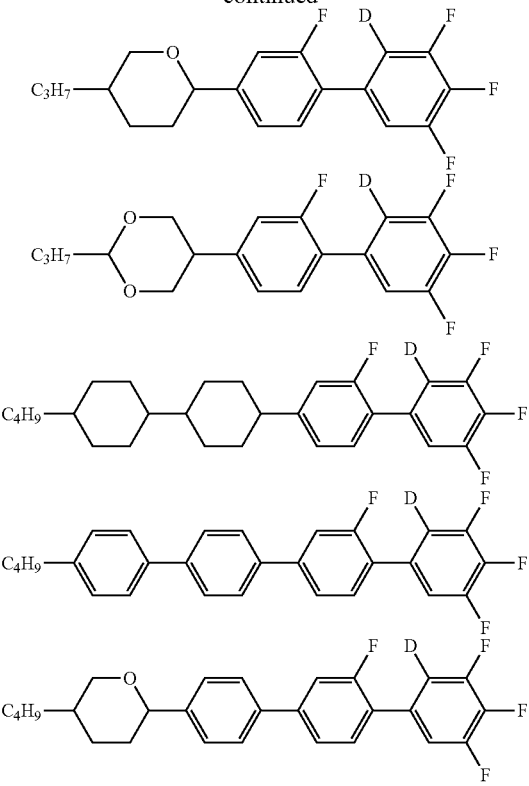

Example 4

Preparation of

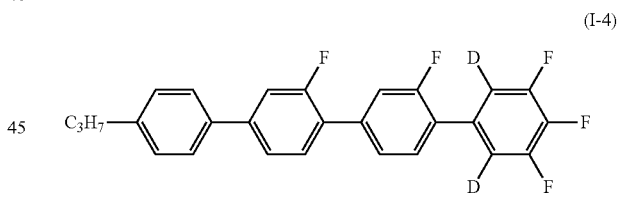
(I-4)

Example 4 is prepared analogously to Example 1,

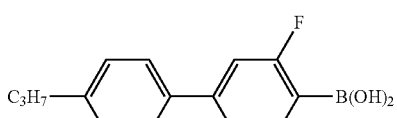

was replaced by

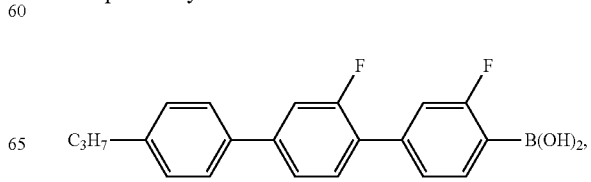

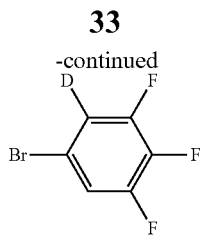

was replaced

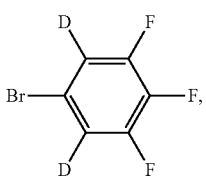

(I-4) was obtained as white crystals.
GC-MS:M⁺ 440 (52.3%), 411 (100%), 183 (2.9%);
$^1$H NMR (300 MHz, CHLOROFORM-D) δ 7.78 (d, J=7.8 Hz, 1H), 7.46 (d, J=7.8 Hz, 1H), 7.12 (d, J=7.8 Hz, 1H), 7.30 (d, J=7.3 Hz, 1H), 7.21 (d, J=11.0 Hz, 1H), 7.18 (d, J=11.0 Hz, 1H), 7.16 (d, J=11.0 Hz, 2H), 7.02 (d, J=11.0 Hz, 2H), 2.60 (t, J=7.6 Hz, 2H), 1.71-1.49 (m, 2H), 0.96 (td, J=7.3, 2.1 Hz, 3H).

On the basis of the above data, the structure of the obtained product is the expected compound I-4

The characterization data of I-4 are as follow:
mp: 132.2° C.
cp: 240.3° C.
Δn [589 nm, 20° C.]: 0.2862
Δ∈ [1 KHz, 20° C.]: 25.97.

The following liquid crystal compounds of formula I were obtained using the method described in example 4 to replace only the different corresponding reactants.

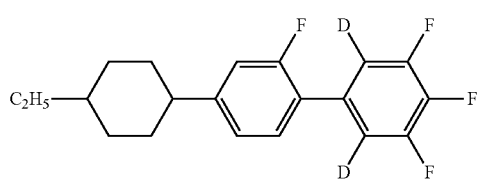 [SMILES: [2H]c1c(-c2ccc(C3CCC(CC)CC3)cc2F)cc(F)c(F)c1F]

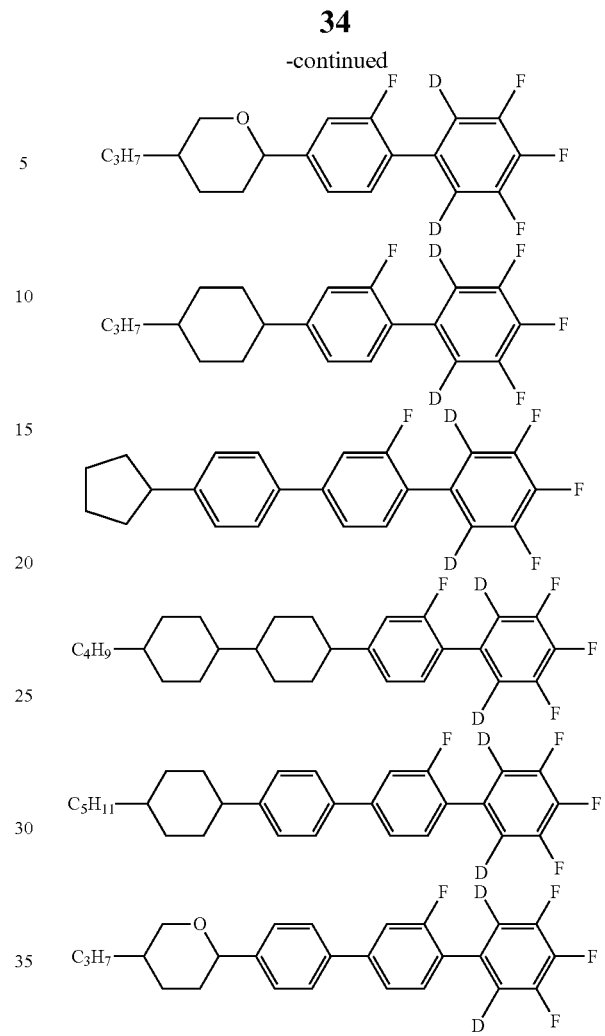

Example 5

Liquid Crystal Mixture a

The mixture a consists of the following compounds in which the compounds have the following mass ratio:

| compound | | mass ratio (%) |
|---|---|---|
| I | 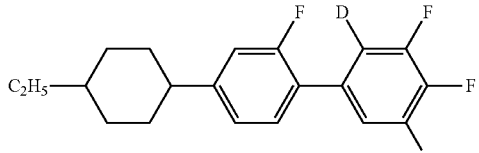 | 12 |
| I | 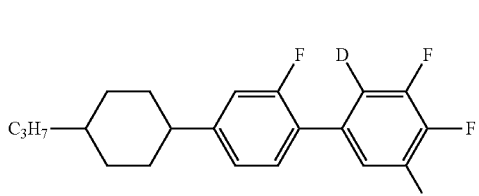 | 20 |

-continued
| | compound | mass ratio (%) |
|---|---|---|
| I | 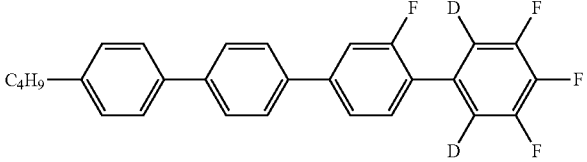 | 5 |
| II | 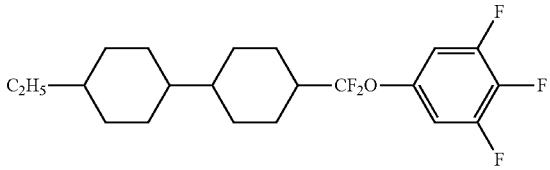 | 13 |
| II | 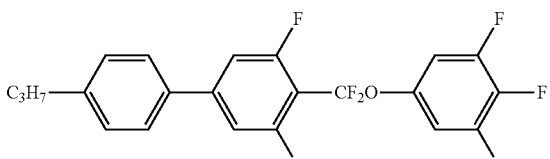 | 11 |
| II | 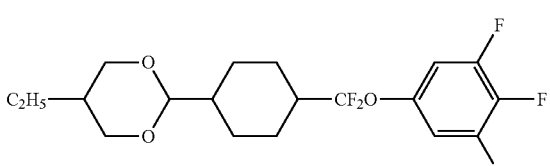 | 3 |
| II | 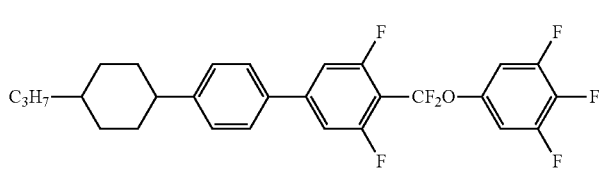 | 3 |
| III | 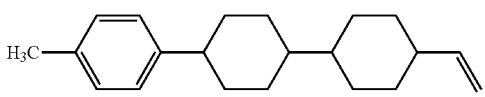 | 9 |
| III | 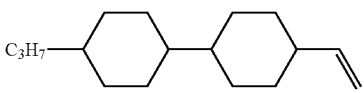 | 11 |
| IV | 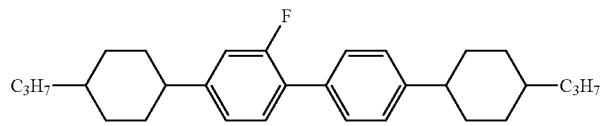 | 4 |
| V | 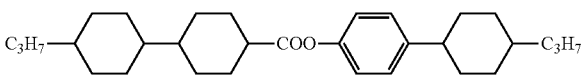 | 4 |
| VI | 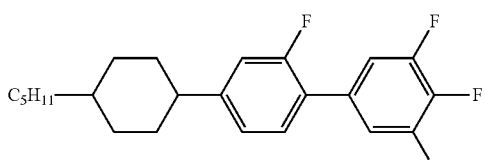 | 5 |

The physical data of the component a are as follows:
cp: 75° C.;
Δε: 8.2 (20° C., 1000 Hz);
Δn: 0.098 (20° C., 589 nm);
$V_{10}$: 1.12V.

Example 6

Liquid Crystal Mixture b

The mixture b consists of the following compounds in which the compounds have the following mass ratio:

| | compound | mass ratio (%) |
|---|---|---|
| I | | 10 |
| I | | 11 |
| I | | 13 |
| II | | 11 |
| II | | 15 |
| II | | 2 |
| II | | 7 |
| III | | 6 |

| compound | mass ratio (%) |
|---|---|
| IV  C₃H₇–[Cy]–[Ph(F)]–[Ph]–[Cy]–C₃H₇ | 9 |
| V  C₃H₇–[Cy]–[Cy]–COO–[Ph]–[Cy]–C₃H | 6 |
| VI  C₅H₁₁–[Cy]–[Ph(2-F)]–[Ph(3,4,5-F)] | 10 |

The physical data of the component b are as follows:
cp: 115° C.;
Δ∈: 13.9 (20° C., 1000 Hz);
Δn: 0.14 (20° C., 589 nm);
$V_{10}$: 0.80V.

Example 7

Liquid Crystal Mixture c

The mixture c consists of the following compounds in which the compounds have the following mass ratio:

| compound | mass ratio (%) |
|---|---|
| I  C₃H₇–[Cy]–[Ph(2-F)]–[Ph(D,D,3,4,5-F)] | 10 |
| I  [Cyclopentyl]–[Cy]–[Ph(2-F)]–[Ph(D,D,3,4,5-F)] | 10 |
| I  C₄H₉–[Cy]–[Cy]–[Ph(2-F)]–[Ph(D,D,3,4,5-F)] | 8 |
| I  C₃H₇–[Tetrahydropyran]–[Ph]–[Ph(2-F)]–[Ph(D,3,4,5-F)] | 9 |
| II  [Cyclopentyl]–[Ph]–[Ph(2,6-F)]–CF₂O–[Ph(3,4,5-F)] | 10 |

-continued
| compound | mass ratio (%) |
|---|---|
| II 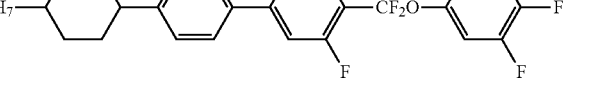 | 6 |
| II  | 7 |
| III 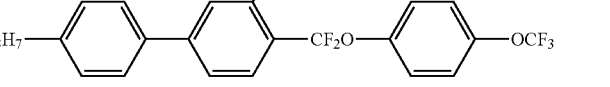 | 4 |
| III 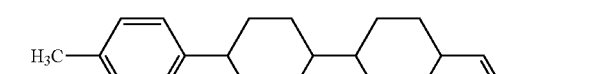 | 17 |
| IV 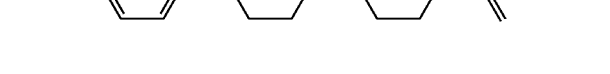 | 5 |
| V 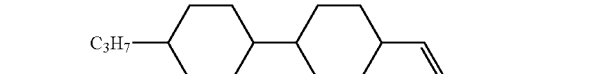 | 5 |
| V 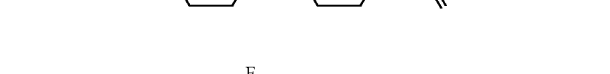 | 4 |
| VI 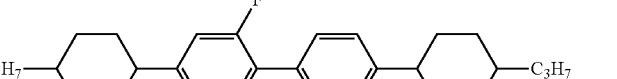 | 5 |
The physical data of the component a are as follows:
cp: 98° C.;
Δε: 10.5 (20° C., 1000 Hz);
Δn: 0.125 (20° C., 589 nm);
$V_{10}$: 1.12V.
Example 8
Liquid Crystal Mixture d
The mixture d consists of the following compounds in which the compounds have the following mass ratio:
| compound | mass ratio (%) |
|---|---|
| I | 6 |

-continued

| | compound | mass ratio (%) |
|---|---|---|
| I | C₃H₇—[Cy]—[Ph(F,D)]—[Ph(F,F,F)] | 10 |
| I | C₅H₁₁—[Cy]—[Ph]—[Ph(F,D)]—[Ph(F,F,F)] | 6 |
| II | C₃H₇—[Ph]—[Ph(F,F)]—CF₂O—[Ph(F,F,F)] | 14 |
| II | C₃H₇—[Cy]—[Ph]—[Ph(F,F)]—CF₂O—[Ph(F,F,F)] | 13 |
| III | C₃H₇—[Cy]—[Cy]—CH=CH₂ | 18 |
| III | H₃C—[Ph]—[Cy]—[Cy]—CH=CH₂ | 8 |
| IV | C₃H₇—[Cy]—[Ph(F)]—[Ph]—[Cy]—C₃H₇ | 8 |
| V | C₃H₇—[Cy]—[Cy]—COO—[Ph]—[Cy]—C₃H | 13 |
| VI | C₃H₇—[Cy]—[Ph(F)]—[Ph(F,F,F)] | 4 |

The physical data of the component a are as follows:

cp: 96° C.;

Δε: 11.6 (20° C., 1000 Hz);

Δn: 0.135 (20° C., 589 nm);

$V_{10}$: 0.98V.

Example 9

Liquid Crystal Mixture e

The mixture e consists of the following compounds in which the compounds have the following mass ratio:

| | compound | mass ratio (%) |
|---|---|---|
| I | C₄H₉–[Cy]–[Cy]–[Ph(2-F)]–[Ph(3-D,4-F,5-F,6-F)] (with 2'-F on first phenyl ring) | 12 |
| I | C₃H₇–[Cy]–[Cy]–[Ph(2-F)]–[Ph(3-D,4-F,5-F,6-F)] | 20 |
| I | C₃H₇–[tetrahydropyran-O]–[Ph]–[Ph(2-F)]–[Ph(3-D,4-F,5-F,6-F)] | 13 |
| II | C₃H₇–[Ph]–[Ph(3-F,5-F)]–CF₂O–[Ph(3-F,4-F,5-F)] | 14 |
| II | C₂H₅–[Cy]–[Cy]–CF₂O–[Ph(3-F,4-F,5-F)] | 6 |
| III | H₃C–[Ph]–[Cy]–[Cy]–CH=CH₂ | 10 |
| IV | C₃H₇–[Cy]–[Ph(2-F)]–[Ph]–[Cy]–C₃H₇ | 5 |
| V | C₃H₇–[Cy]–[Cy]–COO–[Ph]–[Cy]–C₃H | 5 |
| VI | C₃H₇–[Ph]–[Ph(2-F)]–[Ph(3-F,4-F,5-F)] | 15 |

The physical data of the component a are as follows:
cp: 84° C.;
Δ∈: 11.1 (20° C., 1000 Hz);
Δn: 0.117 (20° C., 589 nm);
$V_{10}$: 0.85V.

From the above data of example 5-9, the liquid crystal mixtures having large positive dielectric anisotropy (Δ∈), moderate optical anisotropy (Δn) and driving voltage was expected results.

INDUSTRIAL APPLICATIONS

This invention provides the liquid crystalline compounds of formula I, which have moderate optical anisotropy (Δn), large positive dielectric anisotropy (Δ∈), and moderate driving voltage. It is well suited for development of the liquid crystal mixtures. Therefore, it is found that the compounds of formula I and the mixtures comprising compounds of formula I are suitable for a liquid crystal display device, and particularly suitable for liquid crystal display devices, such as TN, STN, IPS, VA modes.

What is claimed is:
1. A compound comprising:
a compound of formula I:

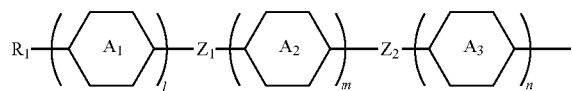

formula I

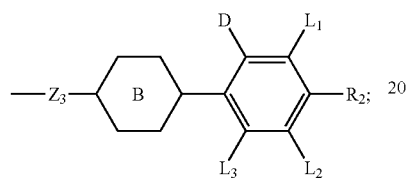

wherein $R_1$, $R_2$ are selected from the group consisting of H, Cl, F, CN, OCN, $OCF_3$, $CF_3$, $CHF_2$, $CH_2F$, $OCHF_2$, SCN, NCS, $SF_5$ and alkyl having 1 to 15 carbons, fluorinated alkyl having 1 to 15 carbons, chlorinated alkyl having 1 to 15 carbons, deuterated alkyl having 1 to 15 carbons, alkoxy having 1 to 15 carbons, fluorinated alkoxy having 1 to 15 carbons, chlorinated alkoxy having 1 to 15 carbons, deuterated alkoxy having 1 to 15 carbons, alkenyl having 2 to 15 carbons, fluorinated alkenyl having 2 to 15 carbons, chlorinated alkenyl having 2 to 15 carbons, deuterated alkenyl having 2 to 15 carbons, alkenoxy having 2 to 15 carbons, fluorinated alkenoxy having 2 to 15 carbons, chlorinated alkenoxy having 2 to 15 carbons, deuterated alkenoxy having 2 to 15 carbons, cyclopropane, cyclobutane, cyclopentane, cyclohexane, cycloheptane wherein one or more —$CH_2$— independently of one another are replaced by —CH=CH—, —C≡C—, —COO—, —OOC—, —O— or —S—;
wherein rings $A_1$, $A_2$ and $A_3$ are independently selected from the group consisting of: a single bond,

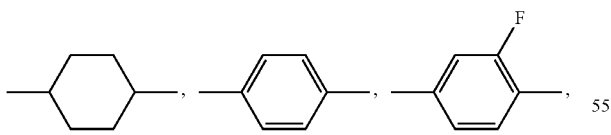

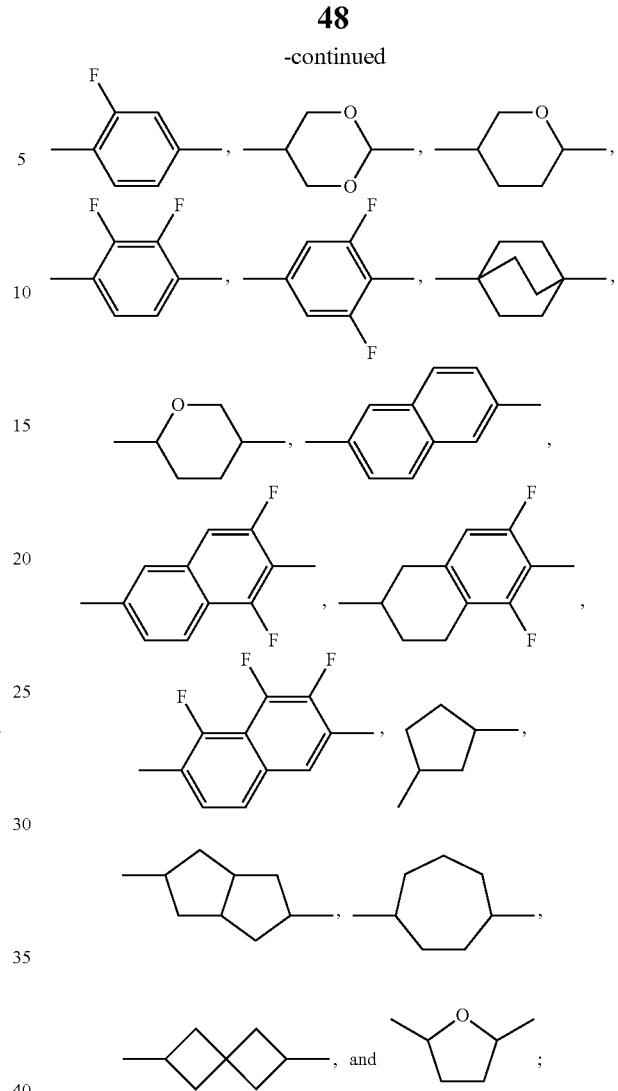

wherein ring B is selected from selected from the group consisting of 1,4-phenylene and 1,4-phenylene, which may be monosubstituted or polysubstituted by fluorine, deuterium, chlorine;
wherein l is 0, 1; m is 0, 1; n is 0, 1;
wherein $Z_1$, $Z_2$ and $Z_3$ are selected from the group consisting of a single bond, —$CH_2$—, —$CH_2$—$CH_2$—, —$(CH_2)_3$—, —$(CH_2)_4$—, —CH=CH—, —C≡C—, —COO—, —OOC—, —$CF_2O$—, —$OCH_2$—, —$CH_2O$—, —$OCF_2$—, —$CF_2CH_2$—, —$CH_2CF_2$—, —$C_2F_4$— and —CF=CF—; and
wherein $L_1$, $L_2$ and $L_3$ are selected from the group consisting of H, F, Cl and D.
2. The compound according to claim 1 comprising:
a compound of formula Ia formula Ia

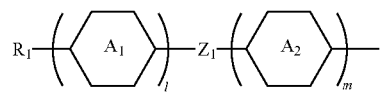

3. A liquid-crystal mixture comprising component a, wherein said component a comprises at least one compound of claim 1.

4. A liquid crystal mixture according to claim 3, wherein the quality percentage of component a is 10-80% in the liquid crystal mixture.

5. A liquid crystal mixture according to claim 3, further comprising component b, component c, component d, component e, and component f;
wherein component b comprises one or more compounds selected from the following formula II;
wherein component c comprises one or more compounds selected from the following formula III;
wherein component d comprises one or more compounds selected from the following formula IV;
wherein component e comprises one or more compounds selected from the following formula V;
wherein component f comprises one or more compounds selected from the following formula VI;

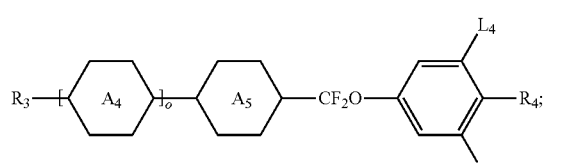
(II)

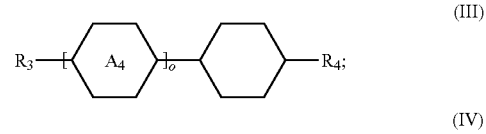
(III)

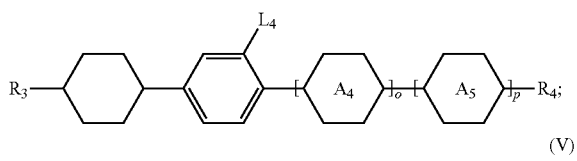
(IV)

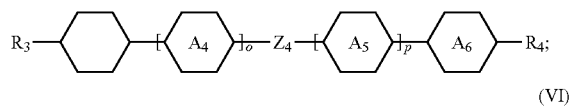
(V)

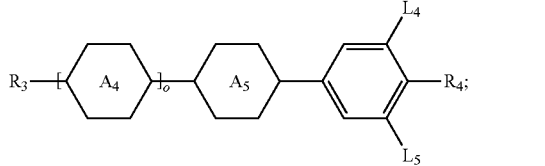
(VI)

wherein $R_3$ and $R_4$ are selected from the group consisting of halogen atom, —CN, alkyl having 1 to 7 carbons, alkoxy having 1 to 7 carbons, alkenyl having 2 to 7 carbons, and fluorinated alkoxy having 1 to 5 carbons;
wherein $Z_4$ is selected from the group consisting of a single bond, —CH$_2$CH$_2$—, —CH═CH—, —C≡C—, —COO—, —OOC—, —OCH$_2$—, —CH$_2$O—, —CF$_2$O—, and —OCF$_2$—;
wherein rings $A_4$, $A_5$ and $A_6$ are independently selected from the group consisting of: a single bond,

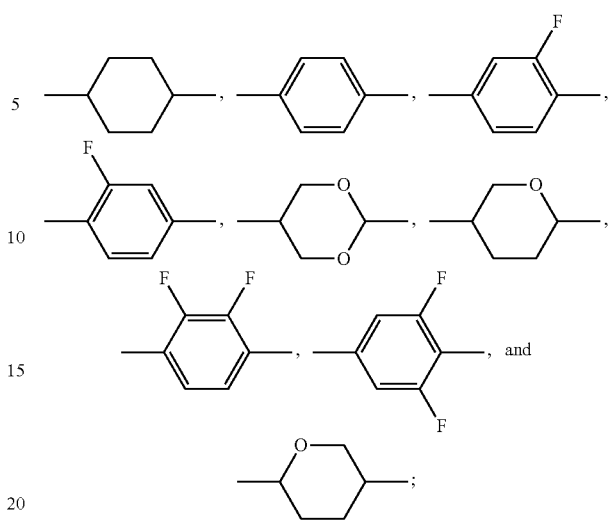

wherein $L_4$ and $L_5$ are selected from the group consisting of H, F, Cl and CN; and
wherein o and p are selected from the group consisting of 0, 1 and 2.

6. The liquid crystal mixture according to claim 5, wherein the mass ratio of component b, component c, component d, component e and component f is 3-40: 3-70: 3-30: 3-30: 3-40 in the liquid crystal mixture.

7. The liquid crystal mixture according to claim 5, wherein the liquid crystal mixture comprises components a-f, the mass ratio of component a, component b, component c, component d, component e and component f is 10-80: 3-40: 3-70: 3-30: 3-30: 3-40 in the liquid crystal mixture.

8. An electro-optical display or liquid crystal display containing a liquid crystal mixture according to claim 4.

9. The electro-optical display or liquid crystal display according to claim 8, wherein the display is TN, STN, IPS or VA liquid crystal display.

10. A liquid crystal mixture according to claim 4, wherein the quality percentage of component a is 20-50% in the liquid crystal mixture.

11. A liquid crystal mixture according to claim 5, wherein the one or more compounds of component b are selected from the group consisting of formula II-1 to II-13:

II-1

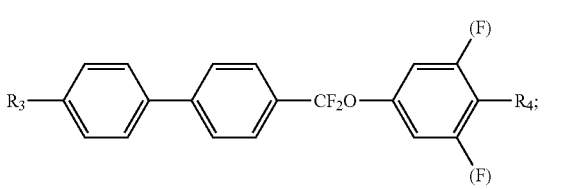
II-2

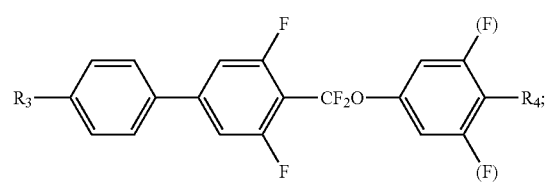
II-3
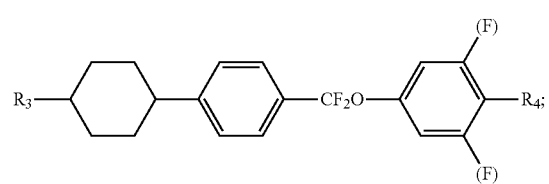
II-4
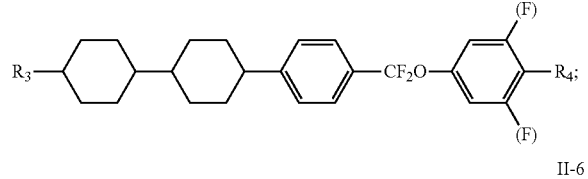
II-5
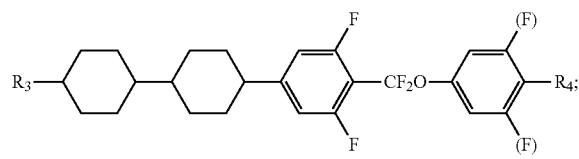
II-6
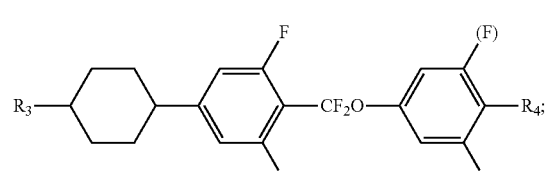
II-7
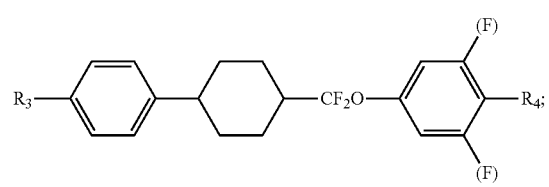
II-8
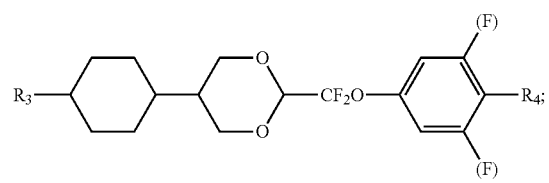
II-9
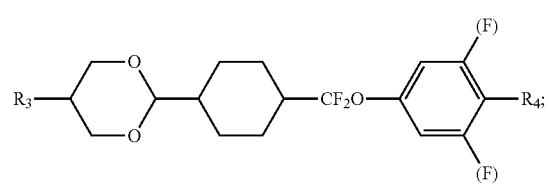
II-10
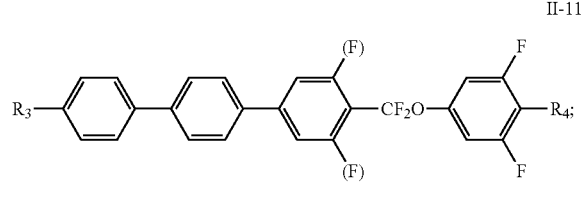
II-11
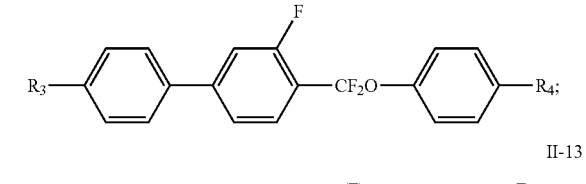
II-12
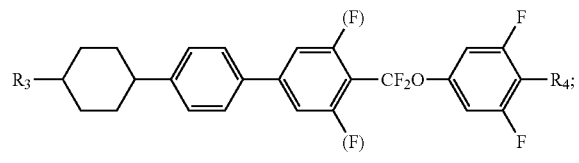
II-13
wherein —(F) is selected from the group consisting of —F and —H.
12. A liquid crystal mixture according to claim 5, wherein the one or more compounds of component c are selected from the group comprising formula III-1 to III-10:
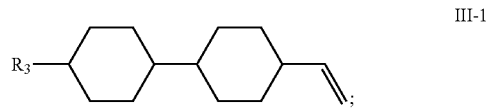
III-1
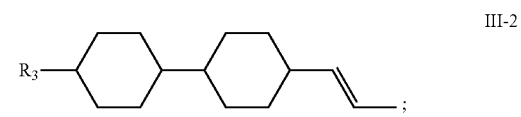
III-2
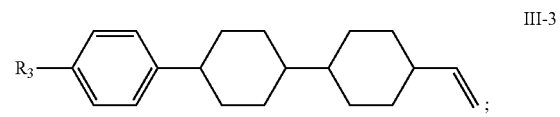
III-3
III-4
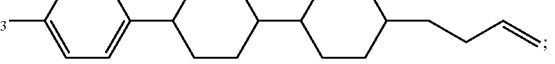
III-5
III-6
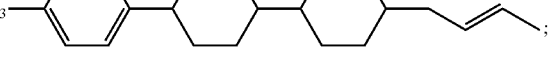
III-7

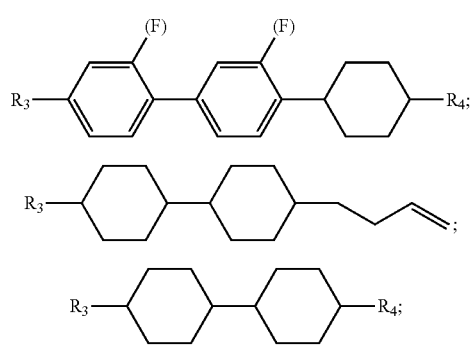

wherein —(F) is selected from the group consisting of —F and —H.

13. A liquid crystal mixture according to claim 5, wherein the one or more compounds of component d are selected from the group consisting of formula IV-1 to IV-3:

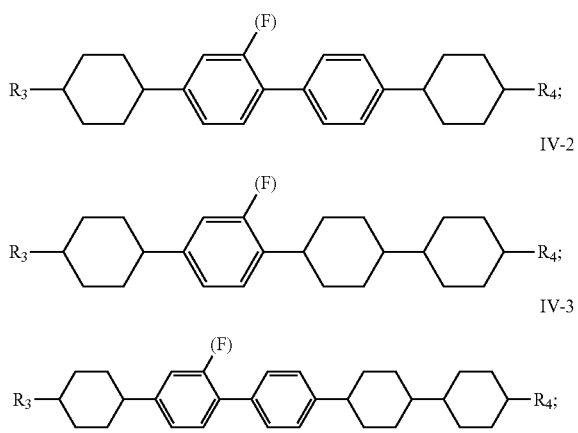

wherein —(F) is selected from the group consisting of —F and —H.

14. A liquid crystal mixture according to claim 5, wherein the one or more compounds of component e are selected from the group consisting of formula V-1 to V-17:

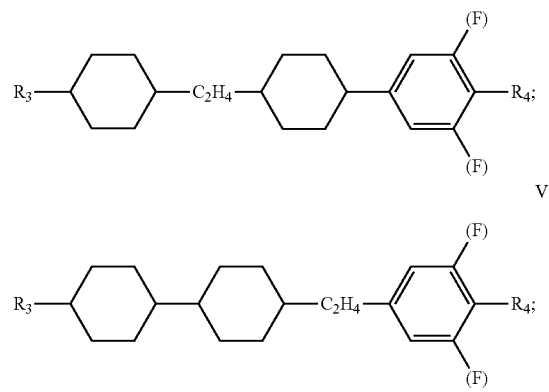

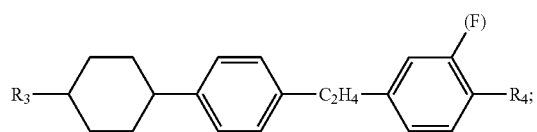

-continued
V-14
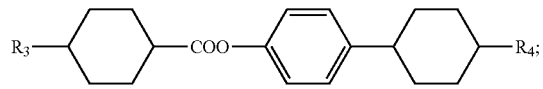
V-15
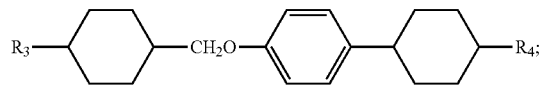
V-16
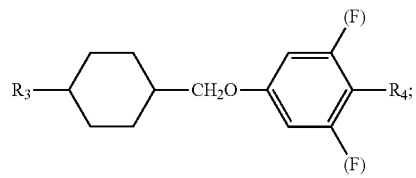
V-17
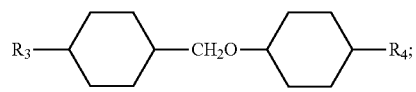
wherein —(F) is selected from the group consisting of —F and —H.
15. A liquid crystal mixture according to claim 5, wherein the one or more compounds of component f are selected from the group consisting of formula VI-1 to VI-13:
VI-1
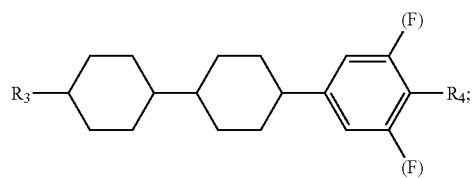
VI-2
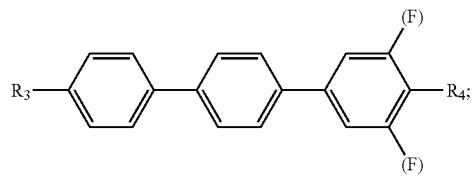
VI-3
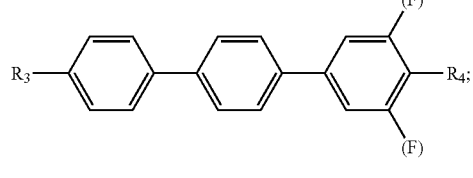
VI-4
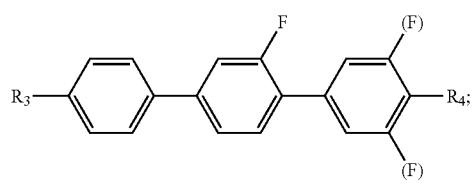
-continued
VI-5
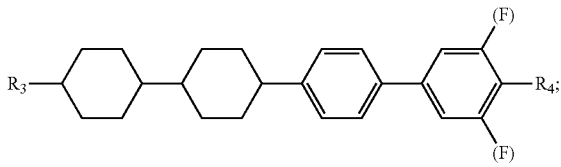
VI-6
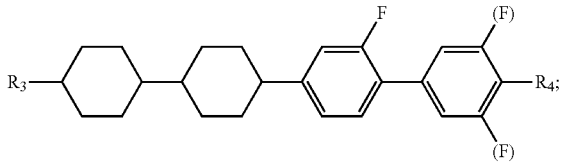
VI-7
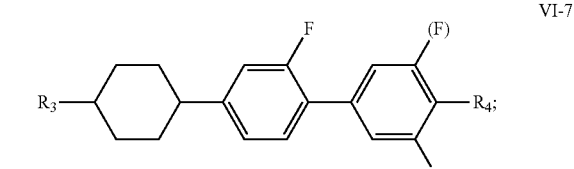
VI-8
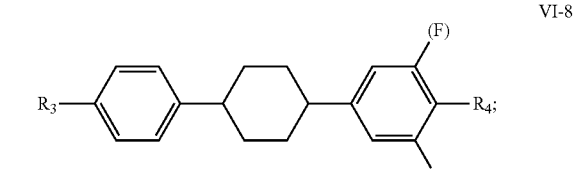
VI-9
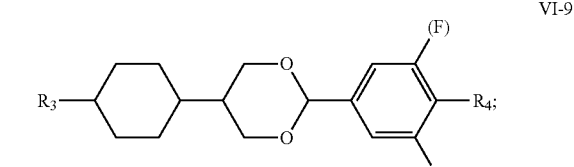
VI-10
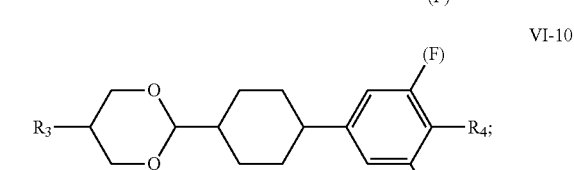
VI-11
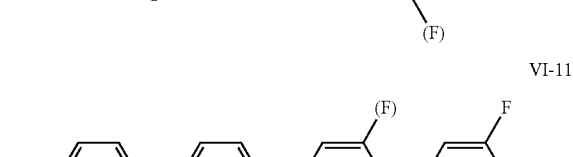
VI-12
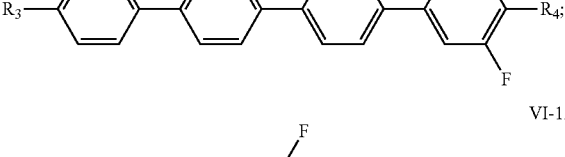
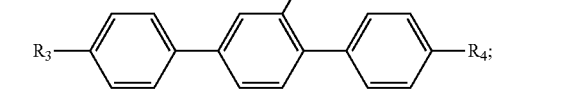

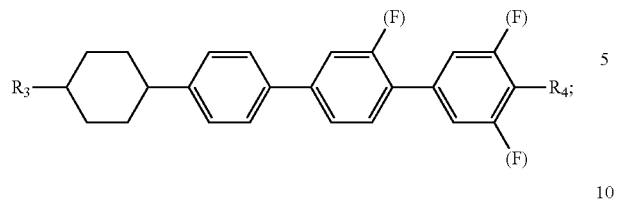

wherein —(F) is selected from the group consisting of —F and —H.

16. A liquid crystal mixture according to claim 6, wherein the mass ratio of component b, component c, component d, component e and component f is 20-40: 5-30: 3-10: 3-15: 3-20 in the liquid crystal mixture.

17. A liquid crystal mixture according to claim 7, wherein the liquid crystal mixture comprises components a-f, the mass ratio of component a, component b, component c, component d, component e and component f is 20-50: 20-40: 5-30: 3-10: 3-15: 3-20 in the liquid crystal mixture.

* * * * *